(12) United States Patent
Chevallier et al.

(10) Patent No.: US 6,468,493 B1
(45) Date of Patent: Oct. 22, 2002

(54) PRECIPITATED SILICA USED AS REINFORCING FILLER FOR ELASTOMERS

(75) Inventors: Yvonick Chevallier, Martin (FR); Philippe Cochet, Lyons (FR); Patrick Fourre, Lyons (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/230,309

(22) PCT Filed: May 15, 1998

(86) PCT No.: PCT/FR98/00975

§ 371 (c)(1),
(2), (4) Date: Jul. 23, 1999

(87) PCT Pub. No.: WO98/54090

PCT Pub. Date: Dec. 3, 1998

(30) Foreign Application Priority Data

May 26, 1997 (FR) ............................................. 97 06369

(51) Int. Cl.⁷ ............................................. C01B 33/193
(52) U.S. Cl. ........................ 423/339; 423/335; 524/492; 524/493
(58) Field of Search ................. 423/335, 339, 423/338; 524/492, 493

(56) References Cited

U.S. PATENT DOCUMENTS

| | | | | |
|---|---|---|---|---|
| 4,874,594 A | * | 10/1989 | Chevallier | 423/335 |
| 5,403,570 A | * | 4/1995 | Chevallier et al. | 423/339 |
| 5,888,467 A | * | 3/1999 | Swift et al. | 423/335 |
| 5,891,949 A | * | 4/1999 | Evans et al. | 524/493 |
| 5,911,963 A | * | 6/1999 | Krivak et al. | 423/335 |
| 5,929,156 A | * | 7/1999 | Fultz et al. | 524/492 |
| 5,958,127 A | * | 9/1999 | Bomal et al. | 106/492 |
| 6,169,135 B1 | * | 1/2001 | Chevallier et al. | 423/335 |

* cited by examiner

*Primary Examiner*—Ngoc-Yen Nguyen

(57) ABSTRACT

The invention relates to a novel process for the preparation of precipitated silica which can be used as a reinforcing filler for elastomers. The invention also relates to novel precipitated silicas in the form of powder, granules or, preferably, substantially spherical beads, these silicas being characterized in that they have a BET specific surface of between 185 and 250 m²/g, a CTAB specific surface of between 180 and 240 m²/g, and a pore distribution such that the pore volume V2 made up of the pores with a diameter of between 175 and 275 Å represents less than 50% of the pore volume V1 made up of the pores with diameters of less than or equal to 400 Å, a pore volume ($V_{d1}$), made up of the pores with a diameter of less than 1 μm, of greater than 1.65 cm³/g, a fineness value (F.V.) of between 70 and 100 Å, and a content of fines ($\tau_f$), after deagglomerability with ultrasound, of at least 50%.

14 Claims, No Drawings

PRECIPITATED SILICA USED AS REINFORCING FILLER FOR ELASTOMERS

CROSS-REFERENCE TO RELATED APPLICATIONS

This application is a 371 of PCT/FR98/00975 filed May 15, 1998.

BACKGROUND OF THE INVENTION

1. Field of the Invention

The present invention relates to a novel process for the preparation of precipitated silica, in particular precipitated silicas in the form of powder, substantially spherical beads or granules, and to their application in reinforcing elastomers.

2. Description of the Related Art including information disclosed under 37 CFR 1.97 and 1.98.

It is known that precipitated silica has long been used as a white reinforcing filler in elastomers.

However, as with any reinforcing filler, it is convenient for it to be manipulable, on the one hand, and especially for it to be readily incorporated in mixtures, on the other hand.

It is known, in general, that in order to obtain the optimum reinforcing properties imparted by a filler, this filler should be present in the elastomer matrix in a final form which is both as finely divided as possible and distributed as homogeneously as possible. However, such conditions can only be achieved provided that, on the one hand, the filler has a very good capacity to be incorporated in the matrix during mixing with the elastomer (incorporability of the filler) and to become disintegrated or deagglomerated in the form of a very fine powder (disintegration of the filler) and provided that, on the other hand, the powder obtained from the above mentioned disintegration process can itself, in turn, be dispersed fully and homogeneously in the elastomer (dispersibility of the powder).

BRIEF SUMMARY OF THE INVENTION

Furthermore, for reasons of mutual affinity, silica particles have an annoying tendency, in the elastomer matrix, to agglomerate together. These silica/silica interactions have the harmful consequence of limiting the reinforcing properties to a level substantially lower than that which could theoretically be achieved if all the silica/elastomer interactions liable to be created during the mixing operation were effectively obtained (this theoretical number of silica/elastomer interactions being, as is well known, directly proportional to the external surface area of the silica used).

In addition, such silica/silica interactions tend, in the raw state, to increase the stiffness and the consistency of the mixtures, thus making them more difficult to use.

These drawbacks are encountered in particular in the case of silicas with a relatively high specific surface area, which, furthermore, generally do not have very good reinforcing properties.

The problem arises of providing fillers which, while having a relatively high specific surface area, show a satisfactory dispersibility in elastomers and good reinforcing properties.

DETAILED DESCRIPTION OF THE INVENTION

The aim of the present invention is to avoid the above-mentioned drawbacks and to solve the problem mentioned above.

With this aim, the invention proposes a novel process for the preparation of precipitated silica, of the type comprising the reaction of a silicate with an acidifying agent, whereby a suspension of precipitated silica is obtained, followed by separation and drying of this suspension, characterized in that:

the precipitation is carried out in the following way:
(i) an initial stock solution is formed containing at least some of the total amount of the silicate used in the reaction and at least one electrolyte, the concentration of silicate (expressed as $SiO_2$) in the said initial stock solution being between 50 and 60 g/l,
(ii) the acidifying agent is added to the said stock solution until a pH value of between 7 and 8.5 for the reaction medium is obtained,
(iii) the acidifying agent is added to the reaction medium along with, where appropriate, simultaneously, the remaining amount of the silicate, the separation comprises a filtration and washing operation using a filter equipped with a means of compacting, a suspension having a solids content of less than 17% by weight is dried by spraying.

It has thus been found that a certain, relatively low, concentration of silicate, expressed as $SiO_2$ in the initial stock solution, combined with the use of a filter equipped with a means of compacting, preferably at a low compacting pressure, and with a suitable solids content of the suspension to be dried constitute important conditions for giving the products obtained their good properties.

It should be noted, in general, that the process concerned is a process for the synthesis of precipitation silica, i.e. an acidifying agent is reacted, under specific conditions, with a silicate.

The choice of acidifying agent and of silicate is made in a manner which is well known per se.

It may be recalled that a strong inorganic acid, such as sulphuric acid, nitric acid or hydrochloric acid, or an organic acid, such as acetic acid, formic acid or carbonic acid, is generally used as acidifying agent.

The acidifying agent can be dilute or concentrated; its normality can be between 0.4 and 8 N, for example between 0.6 and 1.5 N.

In particular, when the acidifying agent is sulphuric acid, its concentration can be between 40 and 180 g/l, for example between 60 and 130 g/l.

It is moreover possible to use, as silicate, any common form of silicate, such as metasilicates, disilicates and advantageously an alkali metal silicate, in particular sodium or potassium silicate.

The silicate can have a concentration, expressed as silica, of between 40 and 330 g/l, for example between 60 and 300 g/l, in particular between 60 and 250 g/l.

In general, sulphuric acid is used as acidifying agent and sodium silicate is used as silicate.

When sodium silicate is used, it generally has an $SiO_2/Na_2O$ weight ratio of between 2 and 4, for example between 3.0 and 3.7.

As more particularly regards the preparation process of the invention, the precipitation is carried out in a specific manner according to the following steps.

A stock solution which comprises silicate and an electrolyte is first formed (step (i)). The amount of silicate present in the initial stock solution advantageously represents only some of the total amount of silicate used in the reaction.

According to an essential characteristic of the preparation process of the invention, the concentration of silicate in the initial stock solution is between 50 and 60 g of $SiO_2$ per litre. Preferably, this concentration is between 55 and 60 g/l.

The initial stock solution comprises an electrolyte. The term electrolyte is understood here in its normal accepted meaning, i.e. it means any ionic or molecular substance which, when in solution, decomposes or dissociates to form ions or charged particles. As electrolyte, mention may be made of a salt from the group of salts of alkali metals and alkaline-earth metals, in particular the salt of the metal of the starting silicate and of the acidifying agent, for example sodium chloride in the case of the reaction of a sodium silicate with hydrochloric acid, or, preferably, sodium sulphate in case of the reaction of a sodium silicate with sulphuric acid.

If the electrolyte used is sodium sulphate, its concentration in the initial stock solution is preferably between 12 and 20 g/l, in particular between 15 and 20 g/l.

The second step consists in adding the acidifying agent to the stock solution of composition described above (step (ii)).

This addition, which entails a corresponding decrease in the pH of the reaction medium, is carried out until a pH of between 7 and 8.5 is reached; in particular between 7 and 8, for example between 7.5 and 8.

Once the desired pH has been reached, the third step (step (iii)) is then carried out.

In the (preferred) case of an initial stock solution comprising only some of the total amount of silicate used in the reaction, a simultaneous addition of acidifying agent and of the remaining amount of silicate is carried out in step (iii).

This simultaneous addition is preferably carried out such that the pH is constantly equal (to within ±0.2) to the value reached after step (ii).

In general, in a subsequent step, an additional amount of acidifying agent is added to the reaction medium, preferably until a pH of between 4 and 6, in particular between 4.5 and 5.5, is obtained in the reaction medium.

In this case, it may be advantageous, after this addition of an additional amount of acidifying agent, to carry out a maturation of the reaction medium, it being possible for this maturation to last, for example, from 1 to 30 minutes, in particular from 2 to 15 minutes.

In the case of an initial stock solution comprising the total amount of the silicate used in the reaction, an addition of acidifying agent is carried out in step (iii), preferably until a pH of between 4 and 6, in particular between 4.5 and 5.5, is obtained in the reaction medium.

In this case, it may again be advantageous, after step (iii), to carry out a maturation of the reaction medium, it being possible for this maturation to last, for example from 1 to 30 minutes, in particular from 2 to 15 minutes.

The temperature of the reaction medium is generally between 68 and 98° C.

According to a variant of the invention, the reaction is carried out at a constant temperature, preferably between 75 and 95° C.

According to another (preferred) variant of the invention, the temperature at the end of the reaction is higher than the temperature at the start of the reaction: thus, the temperature at the start of the reaction is preferably maintained at between 68 and 80° C., and is then increased, preferably to a value of between 80 and 98° C., and is maintained at this value until the end of the reaction.

After the steps which have just been described, a silica broth is obtained, which is then separated (liquid/solid separation).

According to another essential characteristic of the preparation process of the invention, the said separation comprises a filtration and washing operation using a filter equipped with a means of compacting, the compacting pressure preferably being low.

This filter can be a belt filter equipped with a roller which ensures compacting.

However, preferably, the separation comprises a filtration, a washing and then a compacting operation, using a filter press; in general, the pressure at the end of the filtration is between 3.5 and 6.0 bar, for example between 3.8 and 4.5 bar; in a very advantageous manner, the said compacting is carried out by introduction of air at a pressure of less than 4.5 bar, in particular between 3.8 and 4.3 bar, for 20 to 40 seconds, for example for about 30 seconds.

The suspension of precipitated silica thus recovered (filter cake) is then spray-dried.

According to one characteristic of the preparation process of the invention, this suspension should have, immediately before it is spray-dried, a solids content of less than 17% by weight. This solids content is preferably between 14.5 and 16.5% by weight.

It should be noted that, after the filtration, dry material, for example, silica in accordance with the invention in pulverulent form, can also be added to the filter cake, in a subsequent step of the process.

The drying can be carried out using any suitable type of atomizer, in particular a turbine, nozzle, liquid-pressure or twin-fluid atomizer.

It should be noted that the filter cake is not always under conditions which allow spraying, in particular on account of its high viscosity. In a manner which is known per se, the cake is subjected, in this case, to a crumbling operation. This operation can be carried out by passing the cake through a colloidal or ball-type mill. The crumbling is generally carried out in the presence of an aluminium compound, in particular sodium aluminate, and preferably in the presence of an acidifying agent as described above (in the latter case, the aluminium compound and the acidifying agent are advantageously added simultaneously). The crumbling operation makes it possible in particular to lower the viscosity of the suspension to be subsequently dried.

According to a preferred embodiment of the invention, the drying is carried out using a nozzle atomizer. The precipitated silica which can be obtained in this case is advantageously in the form of substantially spherical beads, preferably with an average size of at least 80 $\mu$m, for example at least 100 $\mu$m.

After the drying operation, a step of grinding can be carried out on the recovered product. The precipitated silica which can then be obtained is generally in the form of a powder, preferably with an average size of at least 15 $\mu$m, in particular between 15 and 60 $\mu$m, for example between 20 and 45 $\mu$m.

The ground products with the desired particle size can be separated from any non-conforming products by means, for example, of vibrating screens with appropriate mesh sizes, and the non-conforming products thus recovered can then be sent for grinding.

Similarly, according to another embodiment of the invention, the drying operation is carried out using a turbine atomizer. The precipitated silica which can be obtained in this case can be in the form of a powder, preferably with an average size of at least 15 $\mu$m, in particular between 30 and 150 $\mu$m, for example between 45 and 120 $\mu$m.

Lastly, the dried product (dried in particular by a turbine atomizer) or ground product as indicated above can, according to another embodiment of the invention, be subjected to an agglomeration step.

The term agglomeration is understood here to refer to any process which makes it possible to bind together finely divided objects in order to bring them into the form of objects of larger size with greater mechanical strength.

These processes are, in particular, direct compression, wet granulation (i.e. with the use of a binder such as water, silica slurry, etc.), extrusion and, preferably, dry compacting.

When the latter technique is used, it may prove to be advantageous, before carrying out the compacting, to de-aerate (this operation also known as predensification or degassing) the pulverulent products so as to remove the air included therein and ensure more uniform compacting.

The precipitated silica which can be obtained according to this embodiment of the invention is advantageously in the form of granules, preferably with a size of at least 1 mm, in particular between 1 mm and 10 mm.

After the agglomeration step, the products can be calibrated to a desired size, for example by screening, and then packaged for their future use.

The precipitated silica powders, and the beads, obtained by the process according to the invention thus offer the advantage, inter alia, of allowing simple, effective and economical access to granules as mentioned above, in particular by standard shaping operations such as, for example, granulation or compacting, without these operations entailing any degradations liable to mask, or even destroy, the good intrinsic properties associated with these powders or these beads, as may be the case in the prior art using standard powders.

Other subjects of the invention consist of novel precipitated silicas which, while having a high specific surface area, nevertheless show satisfactory dispersibility and good reinforcing properties, and in particular which, when used as reinforcing fillers for elastomers, give these elastomers good Theological and mechanical properties.

In the account which follows, the BET specific surface is determined according to the Brunauer-Emmet-Teller method described in "The Journal of the American Chemical Society", Vol. 60, page 309, February 1938 and corresponding to standard NF T 45007 (November 1987).

The CTAB specific surface is the external surface area determined according to standard NF T 45007 (November 1987) (5.12).

The DOP oil absorption value is determined according to standard NF T 30-022 (March 1953) using dioctyl phthalate.

The packed filling density (PFD) is measured according to standard NF T 30-042.

The pH is measured according to ISO standard 787/9 (pH of a 5% suspension in water).

The pore volumes given are measured by mercury porosimetry; each sample is prepared as follows: each sample is predried for 2 hours in an oven at 200° C. then placed in a test container within 5 minutes of removal from the oven and is degassed under vacuum, for example using a rotary vane pump; the pore diameters are calculated by means of the Washburn relationship, with a contact angle theta equal to 140° and a surface tension gamma equal to 484 dynes/cm (MICROMERITICS 9300 PROSIMETER®).

The fineness value (FV) represents the median radius of the intra-aggregate pores, i.e. the radius of pores to which the pore surface $S_0/2$ corresponds, measured by mercury porosimetry ($S_0$ is the surface area provided by all the pores of diameter greater than or equal to 100 Å)

The dispersibility of the silicas according to the invention is quantified by means of measuring the fines content ($\tau_f$), i.e. the proportion (by weight) of particles less than 0.3 μm in size, after deagglomerability with ultrasound, carried out according to the dispersibility test described below.

In this test, the silica's dispersibility is measured by means of a particle size measurement, (by sedimentation), carried out on a silica suspension which has been deagglomerated beforehand by ultra-sonication. The ultrasound deagglomerability (or dispersibility) is carried out using a Vibracel Bioblock sonicator (600 W) equipped with a probe 19 mm in diameter. The particle size measurement is taken using a SEDIGRAPH GRANULOMETER (sedimentation in the field of gravity+scanning with a beam of X-rays). 4 grams of silica are weighed into a sample tube (of volume equal to 75 ml) and are made up to 50 grams by addition of deionized water: an aqueous suspension containing 8% silica is thus produced, which is homogenized for 2 minutes by magnetic stirring. The deagglomerability (dispersibility) with ultrasound is then performed as follows: with the probe immersed over a depth of 4 cm, the output power is adjusted so as to obtain a power needle deflection indicating 20%. The deagglomerability is carried out for 210 seconds.

The particle size measurement is then carried out using a Sedigraph granulometer. For this, speed of vertical scanning of the cell by the beam of X-rays is first adjusted to 918, which corresponds to a maximum size analysed of 85 μm. Deionized water is circulated in the said cell, then the electrical zero and the mechanical zero of the paper recorder are adjusted (this adjustment being performed with the "100%" potentiometer of the recorder at the maximum sensitivity). The paper recorder pen is placed at the point representing the initial size of 85 μm. The deagglomerated silica suspension, which has optionally been cooled beforehand is then circulated in the cell of the SEDIGRAPH GRANULOMETER® (the particle size analysis being carried out at 30° C.) and the analysis then begins. The analysis stops automatically once a size of 0.3 μm is reached (about 45 minutes). The content of fines ($\tau_f$), i.e. the proportion (by weight) of particles smaller than 0.3 μm in size, is then calculated.

This content of fines ($\tau_f$), or content of particles smaller than 0.3 μm in size, is proportionately larger the higher the dispersibility of the silica.

In certain cases, the dispersibility (and deagglomerability) of the silicas according to the invention can also be quantified by means of a specific deagglomerability test.

The deagglomerability test is carried out according to the following procedure:

the cohesion of the agglomerates is assessed by a particle size measurement (by laser scattering), carried out on a suspension of silica deagglomerated beforehand by means of ultra-sonication; the deagglomerability of the silica (rupture of the objects from 0.1 to a few tens of microns) is thus measured. The deagglomerability with ultrasound is carried out using a VIBRACELL BIOBLOCK® (600 W) equipped with a probe 19 mm in diameter. The particle size measurement is carried out by means of laser scattering on a Sympatec granulometer. 2 grams of silica are weighed into a sample tube (height: 6 cm and diameter: 4 cm) and are made up to 50 grams by addition of deionized water: an aqueous suspension containing 4% silica is thus produced, which is homogenized for 2 minutes by magnetic stirring. The deagglomerability with ultrasound is then performed as follows: with the probe immersed over a depth of 4 cm, the output power is adjusted so as to obtain a power dial needle deflection indicating 20%. The deagglomerability is carried out for 420 seconds. The particle size measurement is then carried out after a known volume (expressed in ml) of the homogenized suspension has been introduced into the cell of the granulometer.

The value of the median diameter $\phi_{50}$ which is obtained is proportionately smaller the larger the silica's deagglomerability. The ratio (10×volume of suspension introduced (in ml))/optical density of the suspension detected by the granulometer is also determined (this optical density is about 20). This ratio indicates the content of particles smaller than 0.1 μm in size which are not detected by the granulometer. This ratio, known as the ultrasound deagglomerability factor ($F_D$), is proportionately higher the larger the silica's deagglomerability.

A novel precipitated silica is now proposed, according to the invention, this silica being characterized in that it has:

a BET specific surface of between 185 and 240 m²/g, a CTAB specific surface of between 180 and 240 m²/g, a pore distribution such that the pore volume V2 made up of the pores with a diameter of between 175 and 275 Å represents less than 50% of the pore volume V1 made up of the pores with diameters of less than or equal to 400 Å, a pore volume ($V_{d1}$), made up of the pores with a diameter of less than 1 µm, of greater than 1.65 cm³/g, a fineness value (F.V.) of between 70 and 100 Å, a content of fines ($\tau_f$), after deagglomerability with ultrasound, of at least 50%, preferably of at least 55%.

The silica according to the invention has a relatively large specific surface. Its BET specific surface is between 185 and 250 m²/g, preferably between 195 and 225 m²/g, in particular between 200 and 220 m²/g; its CTAB specific surface is between 180 and 240 m²/g, preferably between 185 and 220 m²/g, in particular between 190 and 205 m²/g.

It generally has a BET specific surface/CTAB specific surface ratio ranging between 1.0 and 1.2, i.e. a low microporosity.

One of the characteristics of the precipitated silica according to the invention lies in the pore volume distribution, and in particular in the distribution of the pore volume which is generated by the pores with diameters of less than or equal to 400 Å. The latter volume corresponds to the working pore volume of the fillers used in the reinforcement of elastomers. Analysis of the porograms shows that, in this case, the silica according to the invention has a pore distribution such that the pore volume made up of the pores with a diameter of between 175 and 275 Å represents less than 50%, in particular not more than 45%, especially between 25 and 45%, of the pore volume made up of the pores with diameters of less than or equal to 400 Å.

The silica according to the invention has a pore volume ($V_{d1}$), made up of the pores with a diameter of less than 1 µm, of greater than 165 cm³/g; this pore volume is preferably at least 1.70 cm³/g, in particular between 1.70 and 1.80 cm³/g.

Preferably, its pore volume (V3), made up of the pores with a diameter of between 100 and 300 Å, is at least 0.82 cm³/g, in particular at least 0.85 cm³/g; it is usually at least 0.86 cm³/g.

It generally has a total pore volume (TPV) of greater than 3.0 cm³/g, for example between 3.1 and 3.4 cm³/g.

Its fineness value (F.V.) is between 70 and 100 Å, preferably between 80 and 100 Å, for example between 82 and 98 Å.

The silica according to the invention thus has specific porosity characteristics.

Furthermore, and this is one of the essential characteristics, it has a very satisfactory dispersibility. Thus, it has a fines content ($\tau_f$), or content of particles less than 0.3 µm in size, after deagglomerability with ultrasound, of at least 50%, preferably of at least 55%; this content can be, for example, at least 60%.

In general, its ultrasound deagglomerability factor ($F_D$) is greater than 5.5 ml, in particular greater than 9 ml or even 13 ml.

The silica according to the invention can have a median diameter ($\phi_{50}$), after deagglomerability with ultrasound, of less than 8.5 µm, in particular between 5 and 7 µm.

The pH of the silica according to the invention is usually between 6.0 and 7.5, in particular between 6.3 and 6.9.

Its packed filling density (PFD) is generally greater than 0.26, in particular greater than 0.28; it is, for example, at least equal to 0.30.

The silica according to the invention has an oil absorption value DOP usually ranging between 230 and 330 ml/100 g, preferably between 240 and 300 ml/100 g.

It can be in the form of powder, granules or, advantageously, in the form of substantially spherical beads.

The silica powders according to the invention preferably have an average size of at least 15 µm; this size is, for example, between 15 and 60 µm (in particular between 20 and 45 µm) or between 30 and 150 µm (in particular between 45 and 120 µm).

They make it possible to obtain a good compromise between implementation/mechanical properties in the vulcanized state. They also constitute preferred precursors for the synthesis of granules as mentioned later.

The substantially spherical beads according to the invention preferably have an average size of at least 80 µm.

According to certain variants of the invention, this average bead size is at least 100 µm, for example at least 150 µm; it is generally not more than 300 µm and is preferably between 100 and 270 µm. This average size is determined according to standard NF X 11507 (December 1970) by dry-packing and determination of the diameter corresponding to a cumulative screening residue of 50%.

Such a silica in the form of substantially spherical, advantageously solid, homogeneous beads, which produce very little dust and are of good flowability, has a very satisfactory dispersibility and good reinforcing properties. Such a silica also constitutes a preferred precursor for the synthesis of powders and granules according to the invention.

Such a silica in the form of substantially spherical beads constitutes a very advantageous variant of the invention.

The dimensions of the granules according to the invention are preferably at least 1 mm, in particular between 1 and 10 mm, along the axis of their largest dimension (length).

The said granules can be in very diverse forms. For example, mention may be made in particular of cylindrical, parallelepipedal, pastille and platelet forms or of extrudate forms with circular or multilobed cross-section.

The silicas according to the invention, in particular in powder, substantially spherical bead or granule form, are preferably prepared according to the preparation process in accordance with the invention and described above.

The silicas according to the invention or prepared by the process according to the invention find a particularly advantageous application in the reinforcement of natural or synthetic elastomers. While having a fairly high specific surface, they have a satisfactory dispersibility and good reinforcing properties, in particular when compared with silicas of the prior art with an identical or similar surface area. Furthermore, they generally have reinforcing properties that are comparable to or even better than those of highly dispersible silicas, this being the case for smaller amounts of silicas according to the invention used in elastomers.

The examples which follow illustrate the invention without, however, limiting its scope.

EXAMPLE 1 (Comparative)

The following ingredients:

333 liters of aqueous sodium silicate (65° C.) having an $SiO_2/Na_2O$ weight ratio equal to 3.45 and a density at 20° C. equal to 1.230

667 liters of aqueous solution (20° C.) containing 11.2 kg of $Na_2SO_4$ are introduced into a stainless-steel reactor fitted with an impeller stirring system and heating via a jacket.

The concentration of silicate, expressed as $SiO_2$, in the initial stock solution is thus 78 g/l. The mixture is then brought to a temperature of 70° C. while stirring is continued. Dilute sulphuric acid with a density at 20° C. equal to 1.050 is then introduced therein, at a flow rate of 9.2 l/min, until a pH (measured at its temperature) equal to 8.0 is obtained in the medium. The reaction temperature is 70° C. during the first 25 minutes; it is then brought from 70 to 94° C. over about 10 minutes and then maintained at 94° C. until the end of the reaction.

Aqueous sodium silicate of the type described above is then introduced (i.e. when the pH of the reaction medium has reached a value of 8.0), at a flow rate of 2.5 l/min, and sulphuric acid, also of the type described above, is introduced simultaneously, at a flow rate adjusted such that the pH of the reaction medium during the period of introduction is constantly equal to 8.0±0.1. After 40 minutes of simultaneous addition, the introduction of the sodium silicate is stopped and introduction of the dilute acid is continued for about 10 minutes, so as to bring the pH of the reaction medium to a value equal to 5.2. After this introduction of acid, the reaction broth obtained is kept stirring for 5 minutes.

The total reaction time is 100 minutes.

A precipitated silica broth or suspension is thus obtained, which is then filtered and washed using a filter press with vertical plates, the said plates being equipped with a deformable membrane allowing the filter cake to be compressed by introduction of air under pressure; the precipitated silica broth is first filtered, the pressure at the end of filtration being 5.6 bar; the cake formed is then washed with water, after which it is compacted by introduction of air at a pressure of 6.4 bar for 2 minutes.

The cake obtained is then fluidized by mechanical and chemical action (simultaneous addition of sulphuric acid and of an amount of sodium aluminate corresponding to an Al/SiO$_2$ weight ratio of 0.28%). After this crumbling operation, the resulting broth, with a pH equal to 6.2 and a loss on ignition equal to 82.0 (thus a solids content of 18.0% by weight), is atomized using a nozzle atomizer.

The characteristics of the silica A1 obtained in the form of substantially spherical beads are thus as follows:

| | |
|---|---|
| BET specific surface | 240 m$^2$/g |
| CTAB specific surface | 200 m$^2$/g |
| pore volume V1 represented by the pores of d ≦ 400 Å | 1.03 cm$^3$/g |
| pore volume V2 represented by the pores of 175 Å ≦ d ≦ 275 Å | 0.31 cm$^3$/g |
| ratio V2/V1 | 30% |
| pore volume (V$_{d1}$) made up of the pores of d < 1 μm | 1.64 cm$^3$/g |
| fineness value (F.V.) | 76 Å |
| pore volume V3 represented by the pores of 100 Å ≦ d ≦ 300 Å | 0.85 cm$^3$/g |
| total pore volume (TPV) | 3.16 cm$^3$/g |
| PFD | 0.33 |
| oil absorption value DOP | 256 ml/100 g |
| pH | 6.6 |
| average particle size | 220 μm |

The silica A1 is subjected to the dispersibility test as defined previously in the description: it has a fines content ($\tau_f$), i.e. a proportion of particles less than 0.3 μm in size, after deagglomerability with ultrasound, of 30%.

The silica A1 is subjected to the deagglomerability test as defined previously in the description: after deagglomerability with ultrasound, it has a median diameter ($\phi_{50}$) of 12.0 μm and an ultrasound deagglomerability factor ($F_D$) of 3.0 ml.

EXAMPLE 2 (Comparative)

The following ingredients:

280 liters of aqueous sodium silicate (65° C.) having an SiO$_2$/Na$_2$O weight ratio equal to 3.45 and a density at 20° C. equal to 1.230

720 liters of aqueous solution (20° C.) containing 16.5 kg of Na$_2$SO$_4$ are introduced into a stainless-steel reactor fitted with an impeller stirring system and heating via a jacket.

The concentration of silicate, expressed as SiO$_2$, in the initial stock solution is thus 65 g/l. The mixture is then brought to a temperature of 70° C. while stirring is continued. Dilute sulphuric acid with a density at 20° C. equal to 1.050 is then introduced therein, at a flow rate of 7.7 l/min, until a pH value (measured at its temperature) equal to 8.0 is obtained in the medium. The reaction temperature is 70° C. during the first 25 minutes; it is then brought from 70 to 94° C. over about 10 minutes and then maintained at 94° C. until the end of the reaction.

Aqueous sodium silicate of the type described above is then introduced (i.e. when the pH of the reaction medium has reached a value of 8.0), at a flow rate of 2.1 l/min, and sulphuric acid, also of the type described above, is introduced simultaneously, at a flow rate adjusted such that the pH of the reaction medium during the period of introduction is constantly equal to 8.0±0.1. After 40 minutes of simultaneous addition, the introduction of the sodium silicate is stopped and introduction of the dilute acid is continued for about 10 minutes, so as to bring the pH of the reaction medium to a value equal to 5.2. After this introduction of acid, the reaction broth obtained is kept stirring for 5 minutes.

The total reaction time is 100 minutes.

A precipitated silica broth or suspension is thus obtained, which is then filtered and washed using a filter press with vertical plates, the said plates being equipped with a deformable membrane allowing the filter cake to be compressed by introduction of air under pressure; the precipitated silica broth is first filtered, the pressure at the end of filtration being 5.6 bar; the cake formed is then washed with water, after which it is compacted by introduction of air at a pressure of 6.6 bar for 2 minutes.

The cake obtained is then fluidized by mechanical and chemical action (simultaneous addition of sulphuric acid and of an amount of sodium aluminate corresponding to an Al/SiO$_2$ weight ratio of 0.28%). After this crumbling operation, the resulting broth, with a pH equal to 6.2 and a loss on ignition equal to 82.0 (thus a solids content of 18.0% by weight), is atomized using a nozzle atomizer.

The characteristics of the silica A2 obtained in the form of substantially spherical beads are thus as follows:

| | |
|---|---|
| BET specific surface | 214 m$^2$/g |
| CTAB specific surface | 190 m$^2$/g |
| pore volume V1 represented by the pores of d ≦ 400 Å | 1.01 cm$^3$/g |
| pore volume V2 represented by the pores of 175 Å ≦ d ≦ 275 Å | 0.46 cm$^3$/g |
| ratio V2/V1 | 46% |
| pore volume (V$_{d1}$) made up of the pores of d < 1 μm | 1.68 cm$^3$/g |
| fineness value (F.V.) | 91 Å |
| pore volume V3 represented by the pores of 100 Å ≦ d ≦ 300 Å | 0.85 cm$^3$/g |
| total pore volume (TPV) | 3.11 cm$^3$/g |
| PFD | 0.32 |
| oil absorption value DOP | 256 ml/100 g |
| pH | 6.6 |
| average particle size | 215 μm |

The silica A2 is subjected to the dispersibility test as defined previously in the description: it has a fines content ($\tau_f$), i.e. a proportion of particles less than 0.3 μm in size, after deagglomerability with ultrasound, of 42%.

The silica A2 is subjected to the deagglomerability test as defined previously in the description: after deagglomerability with ultrasound, it has a median diameter ($\phi_{50}$) of 9.0 μm and an ultrasound deagglomerability factor ($F_D$) of 4.5 ml.

EXAMPLE 3

The following ingredients:

275 liters of aqueous sodium silicate (65° C.) having an SiO$_2$/Na$_2$O weight ratio equal to 3.45 and a density at 20° C. equal to 1.230

825 liters of aqueous solution (20° C.) containing 18.2 kg of $Na_2SO_4$ are introduced into a stainless-steel reactor fitted with an impeller stirring system and heating via a jacket.

The concentration of silicate, expressed as $SiO_2$, in the initial stock solution is thus 58 g/l. The mixture is then brought to a temperature of 74° C. while stirring is continued. Dilute sulphuric acid with a density at 20° C. equal to 1.050 is then introduced therein, at a flow rate of 7.6 l/min, until a pH (measured at its temperature) equal to 7.7 is obtained in the medium. The reaction temperature is 74° C. during the first 25 minutes; it is then brought from 74 to 94° C. over about 10 minutes and then maintained at 94° C. until the end of the reaction.

Aqueous sodium silicate of the type described above is then introduced (i.e. when the pH of the reaction medium has reached a value of 7.7), at a flow rate of 2.1 l/min, and sulphuric acid, also of the type described above, is introduced simultaneously, at a flow rate adjusted such that the pH of the reaction medium during the period of introduction is constantly equal to 7.7±0.1. After 40 minutes of simultaneous addition, the introduction of the sodium silicate is stopped and introduction of the dilute acid is continued for about 10 minutes, so as to bring the pH of the reaction medium to a value equal to 5.2. After this introduction of acid, the reaction broth obtained is kept stirring for 5 minutes.

The total reaction time is 98 minutes.

A precipitated silica broth or suspension is thus obtained, which is then filtered and washed using a filter press with vertical plates, the said plates being equipped with a deformable membrane allowing the filter cake to be compressed by introduction of air under pressure; the precipitated silica broth is first filtered, the pressure at the end of filtration being 5.6 bar; the cake formed is then washed with water, after which it is compacted by introduction of air at a pressure of 4 bar for 30 seconds.

The cake obtained is then fluidized by mechanical and chemical action (simultaneous addition of sulphuric acid and of an amount of sodium aluminate corresponding to an $Al/SiO_2$ weight ratio of 0.28%). After this crumbling operation, the resulting broth, with a pH equal to 6.2 and a loss on ignition equal to 83.7% (thus a solids content of 16.3% by weight), is atomized using a nozzle atomizer.

The characteristics of the silica P1 obtained in the form of substantially spherical beads are thus as follows:

| | |
|---|---|
| BET specific surface | 216 m²/g |
| CTAB specific surface | 192 m²/g |
| pore volume V1 represented by the pores of d ≦ 400 Å | 0.97 cm³/g |
| pore volume V2 represented by the pores of 175 Å ≦ d ≦ 275 Å | 0.34 cm³/g |
| ratio V2/V1 | 35% |
| pore volume ($V_{d1}$) made up of the pores of d < 1 μm | 1.73 cm³/g |
| fineness value (F.V.) | 87 Å |
| pore volume V3 represented by the pores of 100 Å ≦ d ≦ 300 Å | 0.86 cm³/g |
| total pore volume (TPV) | 3.15 cm³/g |
| PFD | 0.30 |
| oil absorption value DOP | 295 ml/100 g |
| pH | 6.6 |
| average particle size | 190 μm |

The silica P1 is subjected to the dispersibility test as defined previously in the description: it has a fines content ($\tau_f$), i.e. a proportion of particles less than 0.3 μm in size, after deagglomerability with ultrasound, of 57%.

The silica P1 is subjected to the deagglomerability test as defined previously in the description: after deagglomerability with ultrasound, it has a median diameter ($\phi_{50}$) of 5.2 μm and an ultrasound deagglomerability factor ($F_D$) of 14.4 ml.

EXAMPLE 4

The following ingredients:

275 liters of aqueous sodium silicate (65° C.) having an $SiO_2/Na_2O$ weight ratio equal to 3.45 and a density at 20° C. equal to 1.230

825 liters of aqueous solution (20° C.) containing 18.2 kg of $Na_2SO_4$ are introduced into a stainless-steel reactor fitted with an impeller stirring system and heating via a jacket.

The concentration of silicate, expressed as $SiO_2$, in the initial stock solution is thus 58 g/l. The mixture is then brought to a temperature of 75° C. while stirring is continued. Dilute sulphuric acid with a density at 20° C. equal to 1.050 is then introduced therein, at a flow rate of 7.6 l/min, until a pH (measured at its temperature) equal to 7.7 is obtained in the medium. The reaction temperature is 75° C. during the first 25 minutes; it is then brought from 75 to 94° C. over about 10 minutes and then maintained at 94° C. until the end of the reaction.

Aqueous sodium silicate of the type described above is then introduced (i.e. when the pH of the reaction medium has reached a value of 7.7), at a flow rate of 2.1 l/min, and sulphuric acid, also of the type described above, is introduced simultaneously, at a flow rate adjusted such that the pH of the reaction medium during the period of introduction is constantly equal to 7.7±0.1. After 40 minutes of simultaneous addition, the introduction of the sodium silicate is stopped and introduction of the dilute acid is continued for about 10 minutes, so as to bring the pH of the reaction medium to a value equal to 5.2. After this introduction of acid, the reaction broth obtained is kept stirring for 5 minutes.

The total reaction time is 98 minutes.

A precipitated silica broth or suspension is thus obtained, which is then filtered and washed using a filter press with vertical plates, the said plates being equipped with a deformable membrane allowing the filter cake to be compressed by introduction of air under pressure; the precipitated silica broth is first filtered, the pressure at the end of filtration being 4 bar; the cake formed is then washed with water, after which it is compacted by introduction of air at a pressure of 4 bar for 30 seconds.

The cake obtained is then fluidized by mechanical and chemical action (simultaneous addition of sulphuric acid and of an amount of sodium aluminate corresponding to an $Al/SiO_2$ weight ratio of 0.28%). After this crumbling operation, the resulting broth, with a pH equal to 6.2 and a loss on ignition equal to 83.7% (thus a solids content of 16.3% by weight), is atomized using a nozzle atomizer.

The characteristics of the silica P2 obtained in the form of substantially spherical beads are thus as follows:

| | |
|---|---|
| BET specific surface | 200 m²/g |
| CTAB specific surface | 190 m²/g |
| pore volume V1 represented by the pores of d ≦ 400 Å | 1.03 cm³/g |
| pore volume V2 represented by the pores of 175 Å ≦ d ≦ 275 Å | 0.49 cm³/g |
| ratio V2/V1 | 48% |
| pore volume ($V_{d1}$) made up of the pores of d < 1 μm | 1.80 cm³/g |
| fineness value (F.V.) | 93 Å |
| pore volume V3 represented by the pores of 100 Å ≦ d ≦ 300 Å | 0.87 cm³/g |
| total pore volume (TPV) | 3.32 cm³/g |

|  | -continued |
| --- | --- |
| PFD | 0.31 |
| oil absorption value DOP | 280 ml/100 g |
| pH | 6.6 |
| average particle size | 210 μm |

The silica P2 is subjected to the dispersibility test as defined previously in the description: it has a fines content ($\tau_f$), i.e. a proportion of particles less than 0.3 μm in size, after deagglomerability with ultrasound, of 62%.

The silica P2 is subjected to the deagglomerability test as defined previously in the description: after deagglomerability with ultrasound, it has a median diameter ($\phi_{50}$) of 5.4 μm and an 25 ultrasound deagglomerability factor ($F_D$) of 10.0 ml.

EXAMPLE 5

The following ingredients:

262 liters of aqueous sodium silicate (65° C.) having an $SiO_2/Na_2O$ weight ratio equal to 3.45 and a density at 20° C. equal to 1.230

858 liters of aqueous solution (20° C.) containing 18.7 kg of $Na_2SO_4$ are introduced into a stainless-steel reactor fitted with an impeller stirring system and heating via a jacket.

The concentration of silicate, expressed as $SiO_2$, in the initial stock solution is thus 55 g/l. The mixture is then brought to a temperature of 75° C. while stirring is continued. Dilute sulphuric acid with a density at 20° C. equal to 1.050 is then introduced therein, at a flow rate of 7.25 l/min, until a pH (measured at its temperature) equal to 7.7 is obtained in the medium. The reaction temperature is 75° C. during the first 25 minutes; it is then brought from 75 to 94° C. over about 10 minutes and then maintained at 94° C. until the end of the reaction.

Aqueous sodium silicate of the type described above is then introduced (i.e. when the pH of the reaction medium has reached a value of 7.7), at a flow rate of 1.9 l/min, and sulphuric acid, also of the type described above, is introduced simultaneously, at a flow rate adjusted such that the pH of the reaction medium during the period of introduction is constantly equal to 7.7±0.1. After 40 minutes of simultaneous addition, the introduction of the sodium silicate is stopped and introduction of the dilute acid is continued for about 10 minutes, so as to bring the pH of the reaction medium to a value equal to 5.2. After this introduction of acid, the reaction broth obtained is kept stirring for 5 minutes.

The total reaction time is 101 minutes.

A precipitated silica broth or suspension is thus obtained, which is then filtered and washed using a filter press with vertical plates, the said plates being equipped with a deformable membrane allowing the filter cake to be compressed by introduction of air under pressure; the precipitated silica broth is first filtered, the pressure at the end of filtration being 5.6 bar; the cake formed is then washed with water, after which it is compacted by introduction of air at a pressure of 4 bar for 30 seconds.

The cake obtained is then fluidized by mechanical and chemical action (simultaneous addition of sulphuric acid and of an amount of sodium aluminate corresponding to an $Al/SiO_2$ weight ratio of 0.28%). After this crumbling operation, the resulting broth, with a pH equal to 6.2 and a loss on ignition equal to 83.5% (thus a solids content of 16.5% by weight), is atomized using a nozzle atomizer.

The characteristics of the silica P3 obtained in the form of substantially spherical beads are thus as follows:

| | |
| --- | --- |
| BET specific surface | 215 m²/g |
| CTAB specific surface | 197 m²/g |
| pore volume V1 represented by the pores of d ≦ 400 Å | 1.02 cm³/g |
| pore volume V2 represented by the pores of 175 Å ≦ d ≦ 275 Å | 0.27 cm³/g |
| ratio V2/V1 | 26% |
| pore volume ($V_{d1}$) made up of the pores of d < 1 μm | 1.72 cm³/g |
| fineness value (F.V.) | 83 Å |
| pore volume V3 represented by the pores of 100 Å ≦ d ≦ 300 Å | 0.86 cm³/g |
| total pore volume (TPV) | 3.14 cm³/g |
| PFD | 0.30 |
| oil absorption value DOP | 285 ml/100 g |
| pH | 6.6 |
| average particle size | 210 μm |

The silica P3 is subjected to the dispersibility test as defined previously in the description: it has a fines content ($\tau_f$), i.e. a proportion of particles less than 0.3 μm in size, after deagglomerability with ultrasound, of 55%.

The silica P3 is subjected to the deagglomerability test as defined previously in the description.

After deagglomerability with ultrasound, it has a median diameter ($\phi_{50}$) of 6.4 μm and an ultrasound deagglomerability factor ($F_D$) of 9.1 ml.

The characteristics of the silicas prepared in Examples 1 to 5 above, as well as those of a commercial silica, in the form of powder and granules, sold by the company PPG Industries, in this case HI-SIL®2000 (reference A3), and those of the silica (reference MP1) in the form of substantially spherical beads, prepared in Example 12 of patent application EP-A-0,520,862 (Application No. 92401677.7), are collated in Table I below.

TABLE I

|  | A1 | A2 | A3 | MP1 | P1 | P2 | P3 |
| --- | --- | --- | --- | --- | --- | --- | --- |
| $S_{BET}$ (m²/g) | 240 | 214 | 239 | 170 | 216 | 200 | 215 |
| $S_{CTAB}$ (m²/g) | 200 | 190 | 212 | 160 | 192 | 190 | 197 |
| V1 (cm³/g) | 1.03 | 1.01 | 1.07 | 0.90 | 0.97 | 1.03 | 1.02 |
| V2 (cm³/g) | 0.31 | 0.46 | 0.20 | 0.55 | 0.34 | 0.49 | 0.27 |
| V2/V1 (%) | 30 | 46 | 19 | 61 | 35 | 48 | 26 |
| Vd1 (cm³/g) | 1.64 | 1.68 | 1.93 | 1.80 | 1.73 | 1.80 | 1.72 |
| F.V. (Å) | 76 | 91 | 76 | 120 | 87 | 93 | 83 |
| $T_f$ (%) | 30 | 44 | 29 | 78 | 57 | 56 | 55 |
| V3 (cm³/g) | 0.85 | 0.85 | 0.88 | 0.77 | 0.86 | 0.87 | 0.86 |
| TPV (cm³/g) | 3.16 | 3.11 | 2.70 | 3.00 | 3.15 | 3.32 | 3.14 |
| PFD | 0.33 | 0.32 | 0.32 | 0.28 | 0.30 | 0.31 | 0.30 |
| DOP (ml/100 g) | 256 | 256 | 295 | 276 | 295 | 280 | 285 |
| pH | 6.6 | 6.6 | 6.8 | 6.7 | 6.6 | 6.6 | 6.6 |

TABLE I-continued

|  | A1 | A2 | A3 | MP1 | P1 | P2 | P3 |
|---|---|---|---|---|---|---|---|
| Average size ($\mu$m) | 220 | 215 | * | 260 | 190 | 210 | 210 |
| $\phi_{50}$ ($\mu$m) | 12.0 | 9.0 | 12.9 | 4.3 | 5.2 | 10.0 | 6.4 |
| $F_D$ ($\mu$m) | 3.0 | 4.5 | 2.0 | 6.5 | 14.4 | 5.4 | 9.1 |

*not measured

EXAMPLE 6

This example illustrates the use and behaviour of silicas according to the invention and of silicas not in accordance with the invention, in an industrial rubber formulation.

The following formulation is used (the parts are expressed by weight):

| | |
|---|---|
| S.B.R. rubber [1] | 103 |
| B.R. rubber 1220 [2] | 25 |
| silica | 70 (80 in the case of MP1) |
| ZnO [3] | 2.5 |
| stearic acid | 2 |
| 6PPD [4] | 1.9 |
| CBS [5] | 1.7 |
| DPG [6] | 2 |
| sulphur [7] | 1.4 |
| silane X50S [8] | 12.8 |

[1] Styrene/butadiene copolymer in solution of the type BUNA 1955S25, sold by the company Bayer
[2] Polybutadiene polymer of the type B.R. 1220, sold by the company Shell
[3] Rubber-quality zinc oxide
[4] N-(1,3-Dimethylbutyl)-N'-phenyl-p-phenylenediamine sold by the company Akzo
[5] N-Cyclohexyl-2-benzothiazyl sulphenamide
[6] Diphenylguanidine
[7] Vulcanizing agent
[8] Silica/rubber coupling agent, on carbon black support, sold by the company Degussa The formulations are prepared in the following way, in two stages:

Stare 1

The following ingredients are introduced, in this order and at the times indicated in brackets (the temperature increasing gradually from 60 to 160° C.) into an internal mixer (Banbury type):

S.B.R. and B.R. 1220 ($t_0$) (60° C.),

⅔ of the amount of silica and the X50S ($t_0$+1 mn, the remainder (⅓) of the silica and the stearic acid ($t_0$+2 mn).

The mixer is unloaded (dropping of the mixture) when the chamber temperature reaches 160° C.

Stage 2

The mixture obtained after Stage 1 is reintroduced into the internal mixer ($t_0'$) at 60° C. (the temperature then rising gradually).

The active ZnO and the 6PPD are then introduced ($t_0'$+30 s).

The mixer is unloaded (dropping of the mixture) when the chamber temperature reaches 160° C. The mixture is then introduced into a cylinder mixer, maintained at 40° C., in order to be calendered therein. The CBS, the DPG and the sulphur are introduced into this mixer.

After homogenization and three fine screenings, the final mixture is calendered in the form of sheets 2.5 to 3 mm in thickness.

The test results are as follows:

1-Rheological Properties

The measurements are taken on the crude formulations at 170° C.

The apparatus used to carry out the measurements is a Monsanto 100 S rheometer.

The results are given in Table II below.

TABLE II

|  | A1 | A2 | A3 | MP1 | P1 | P2 | P3 |
|---|---|---|---|---|---|---|---|
| Min. torque (in. lb) | 27 | 25 | 32 | 18 | 21 | 19 | 21 |
| Max. torque (in. lb) | 85 | 82 | 84 | 76 | 78 | 77 | 80 |

The formulations obtained from the silicas according to the invention (P1, P2, P3) give:

lower values than those of the formulations prepared from the silicas A1, A2 and A3, values not far from those of the formulation obtained from the silica MP1.

This reflects a great ease of implementation of the mixtures prepared from the silicas according to the invention, in particular as regards the extrusion and calendering operations often carried out during the manufacture of elastomeric compositions (reduced energy cost to prepare the mixture, greater ease of injection during mixing, less swelling at the die during extrusion, less shrinkage on calendering, etc.).

2-Mechanical Properties

The measurements are taken on the vulcanized formulations.

The vulcanization is obtained by maintaining the formulations at 150° C. for 40 minutes.

The following standards were used:

(i) tensile tests (moduli, tensile strength)

NF T 46-002 or ISO 37-1977 (DIN 53 504)

(ii) tear strength tests

NF T 46-007 (notched at 0.5 mm)

The results obtained are given in Table III below.

TABLE III

|  | A1 | A2 | A3 | MP1 | P1 | P2 | P3 |
|---|---|---|---|---|---|---|---|
| 100% Modulus (MPa) | 4.8 | 4.5 | 3.9 | 3.0 | 3.3 | 3.0 | 3.2 |
| 300% Modulus (MPa) | 12.5 | 13.5 | 12.4 | 14.7 | 14.5 | 13.7 | 13.8 |
| 300% Modulus/100% Modulus | 2.6 | 3.0 | 3.2 | 4.7 | 4.4 | 4.6 | 4.3 |
| Tensile strength (MPa) | 13.0 | 17.5 | 17.1 | 19.4 | 19.5 | 20.2 | 19.6 |
| Tear strength (kN/M) | 33.0 | 32.7 | 30.5 | 36.7 | 41.1 | 42.6 | 37.3 |

These results show that the silicas according to the invention afford very good mechanical properties.

On the one hand, the silicas according to the invention lead to low 100% moduli, which is proof of good dispersibility of the silica, and to fairly high 300% moduli, which is proof of a high density of silica/rubber interactions. Furthermore, they lead to a high 300% modulus/100% modulus ratio, i.e. a very good compromise between these two moduli, which is proof of a good reinforcing effect.

On the other hand, the high reinforcing power of the silicas according to the invention is also confirmed by the high values obtained for the tensile strength and the tear strength.

The silicas according to the invention thus impart a higher level of performance to all of the mechanical properties.

3-Dynamic Properties

The measurements are taken on the vulcanized formulations.

The vulcanization is obtained by maintaining the formulations at 150° C. for 40 minutes. The results (illustrating the susceptibility to heating) are given in Table IV below (the lower the values, the lower the susceptibility to heating). The apparatus used for carrying out the measurements is indicated.

TABLE IV

|  | A1 | A2 | A3 | MP1 | P1 | P2 | P3 |
|---|---|---|---|---|---|---|---|
| Internal heating (° C.)[(1)] | 111 | 92 | 101 | 84 | 89 | 84 | 88 |
| 70° C. tan delta[(2)] | 0.14 | 0.14 | 0.16 | 0.14 | 0.13 | 0.13 | 0.13 |

[(1)]Goodrich flexometer
[(2)]Instron viscoelasticimeter

The susceptibility to heating obtained using the silicas according to the invention is fairly low.

In particular, it is less than that observed with the silicas A1, A2 and A3 which have a specific surface of the same order.

It is close to that observed with the silica MP1 which has a much lower specific surface; the tan delta is even lower than that observed with the latter silica.

What is claimed is:

1. A process for preparing precipitated silica comprising a reaction of a silicate with an acidifying agent to produce a suspension of precipitated silica and, then, separating and drying the suspension to obtain the precipitated silica as a dried product, wherein the precipitation is carried out by the steps comprising:
   (i) forming an initial base stock solution comprising at least a part of the total amount of silicate used in the reaction and at least one electrolyte, the silicate concentration, expressed as $SiO_2$, in said initial base stock being between 50 and 60 g/l,
   (ii) adding the acidifying agent to said base stock solution until a pH value of between 7 and 8.5 is obtained, and
   (iii) adding simultaneously additional acidifying agent and the remaining part of silicate to said base stock solution,
wherein the separation comprises a filtration, a washing and a compacting operation using a filter to form a cake, said filter being equipped with means for compacting the cake which is then fluidized in order to obtain a suspension having a solids content of less than 17% by weight which is dried by spraying to obtain a dried product.

2. A process according to claim 1, wherein the concentration of silicate in step (i) is between 55 and 60 g/l.

3. A process according to claim 1, wherein said elctrolyte is sodium sulphate whose concentration in the initial base stock solution is between 12 and 20 g/l.

4. A process according to claim 3, wherein said sodium sulphate concentration is between 15 and 20 g/l.

5. A process according to claim 1, wherein, after step (i), it further comprises the step of:
   (iv) adding additional amount of acidifying agent to the base stock.

6. A process according to claim 1, wherein, after step (i), said process further comprises the step of:
   (iv) adding additional amount of acidifying agent to the base stock until a pH of between 4 and 6 is obtained.

7. A process according to claim 1, wherein the total amount of the silicate used in the reaction is added in step (i), and wherein, in step (iii), the acidifying agent is added until a pH of between 4 and 6 is obtained.

8. A process according to claim 1, wherein the suspension has a solids content of between 14.5 and 16.5% by weight.

9. A process according to claim 1, wherein said drying is carried out with a nozzle atomizer.

10. A process according to claim 1, wherein the compacting means is a filter press.

11. A process according to claim 10, wherein said compacting is carried out by adding air to the cake at a of less 4.5 bar for 20 to 40 seconds.

12. A process according to claim 11, wherein the pressure is between 3.8 and 4.3 bar.

13. A process according to claim 1, wherein the dried product is subsequently ground and then, optionally, agglomerated.

14. A process according to claim 1, wherein the dried product is agglomerated.

* * * * *